Aug. 22, 1967 W. J. OPOCENSKY 3,337,732
SCREW DRIVE MECHANISM FOR MOVING AN ARTICLE
ALONG A RECTILINEAR PATH INDEPENDENTLY
OF IRREGULARITIES IN SAID SCREW
Filed Feb. 3, 1964 4 Sheets-Sheet 1
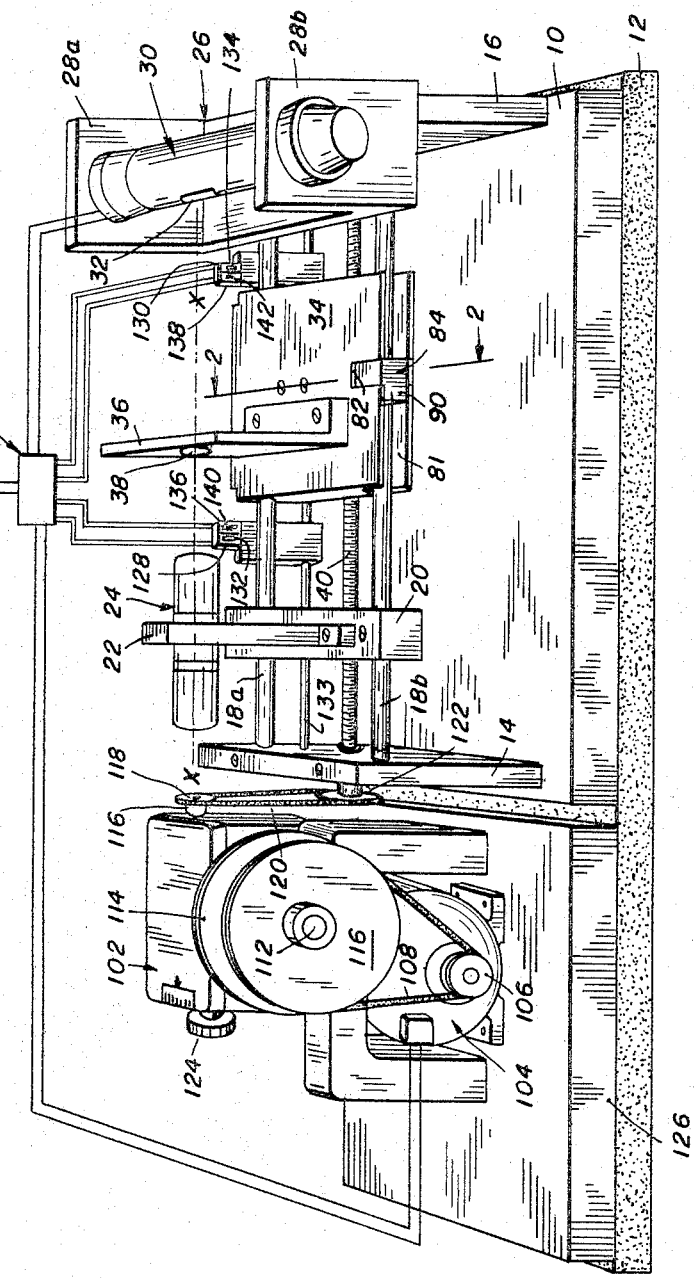
INVENTOR
WILLARD J. OPOCENSKY
BY
ATTORNEY

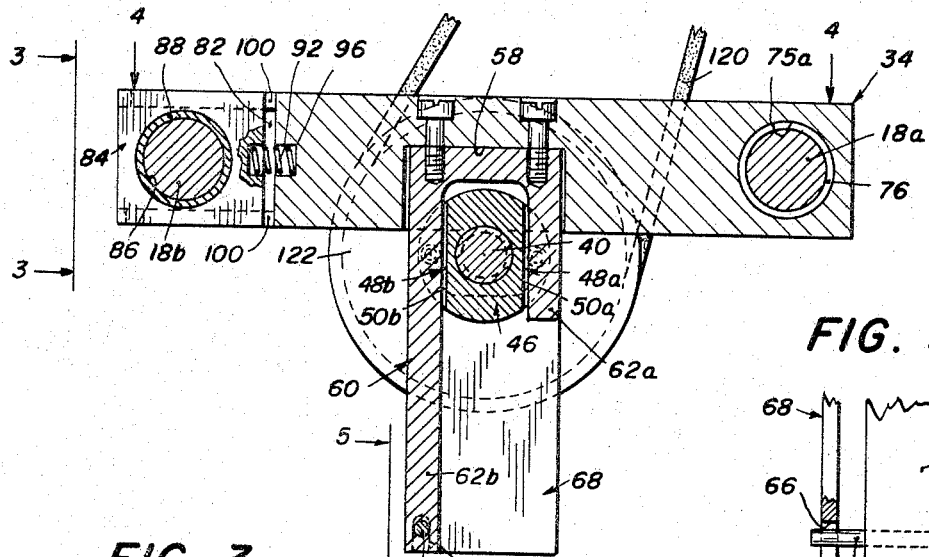
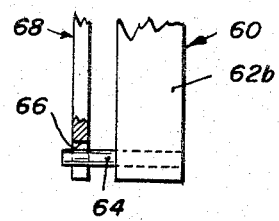
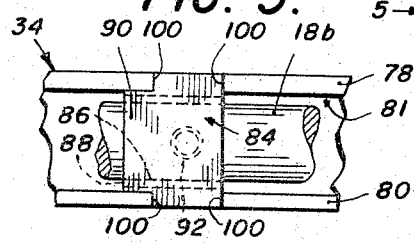
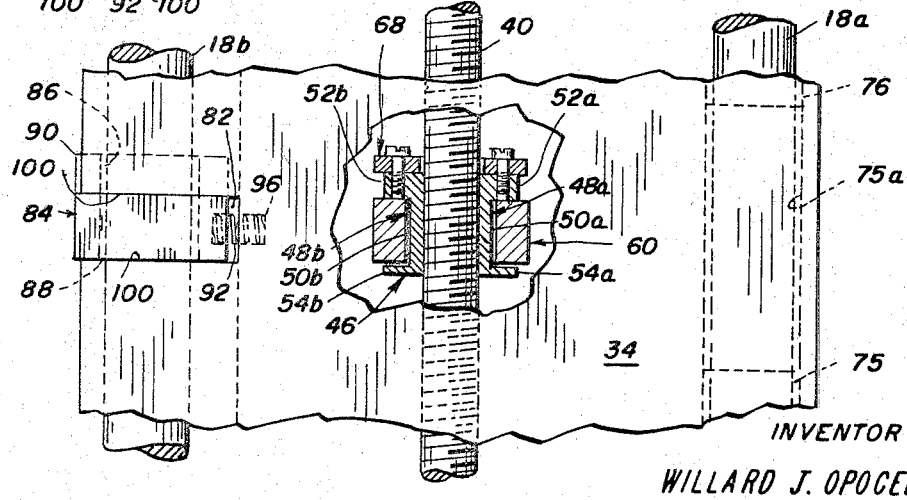

Aug. 22, 1967
W. J. OPOCENSKY
3,337,732
SCREW DRIVE MECHANISM FOR MOVING AN ARTICLE
ALONG A RECTILINEAR PATH INDEPENDENTLY
OF IRREGULARITIES IN SAID SCREW
Filed Feb. 3, 1964
4 Sheets-Sheet 3
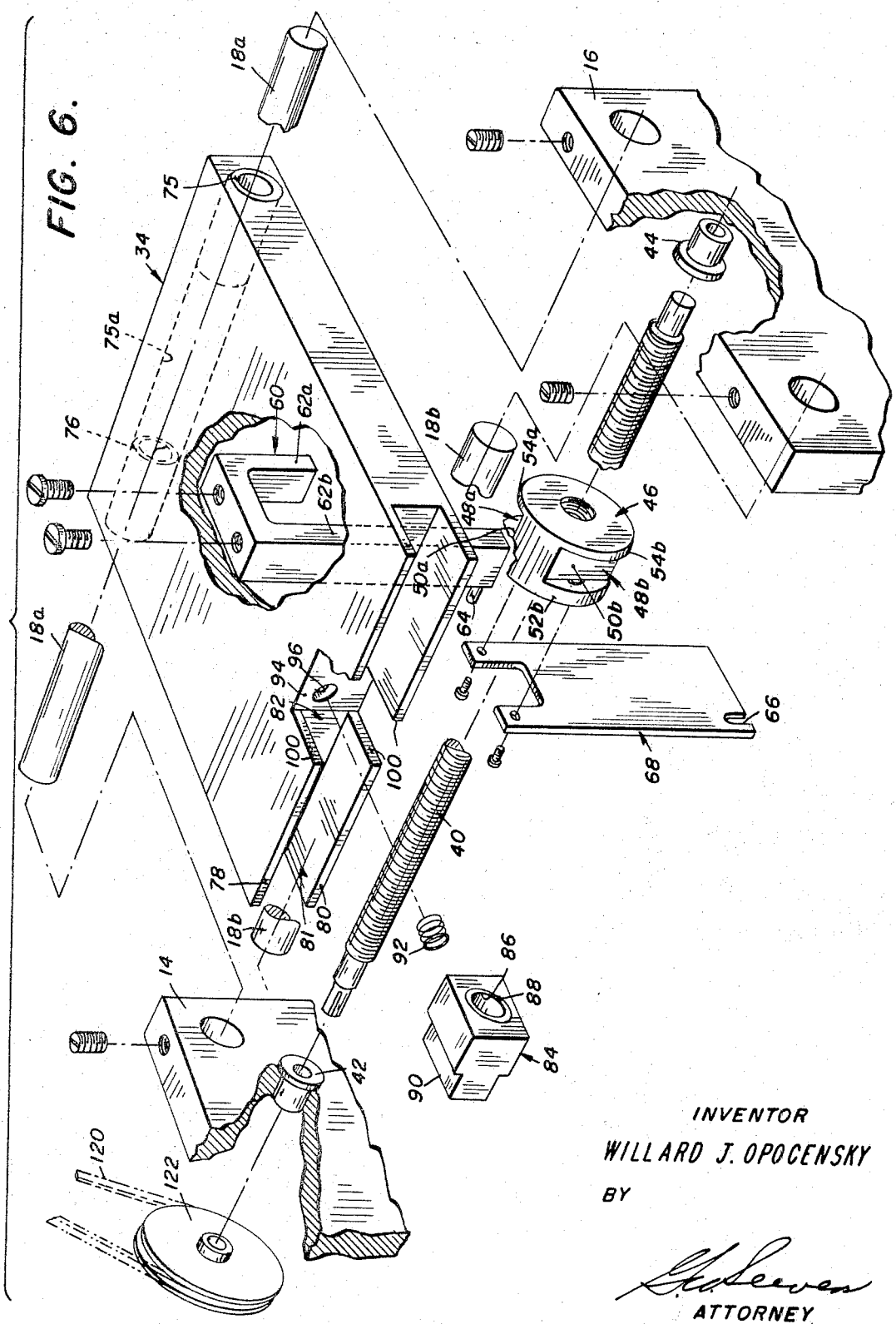
INVENTOR
WILLARD J. OPOCENSKY
BY
ATTORNEY

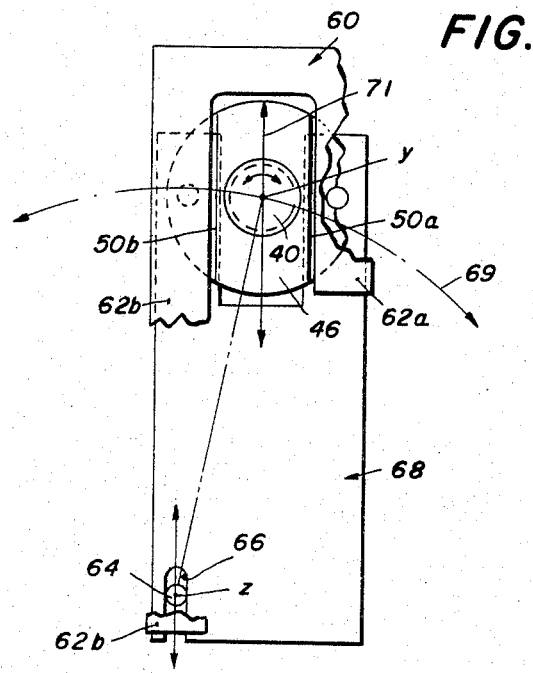
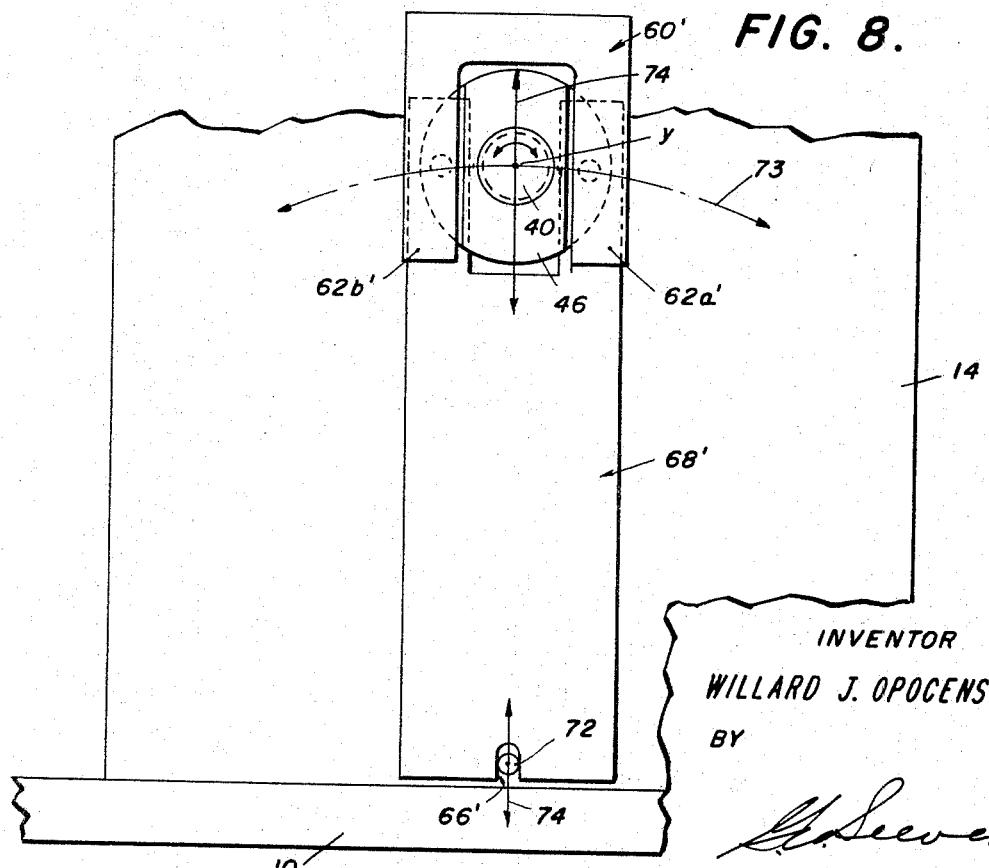

United States Patent Office 3,337,732
Patented Aug. 22, 1967

3,337,732
SCREW DRIVE MECHANISM FOR MOVING AN ARTICLE ALONG A RECTILINEAR PATH INDEPENDENTLY OF IRREGULARITIES IN SAID SCREW
Willard J. Opocensky, Glendale, Calif., assignor to General Precision, Inc., a corporation of Delaware
Filed Feb. 3, 1964, Ser. No. 341,951
15 Claims. (Cl. 250—52)

The present invention relates to apparatus for moving an article along a rectilinear path. More particularly, the present invention relates to apparatus by means of which two articles may selectively be moved toward, and away from each other at predeterminably uniform speeds. Apparatus of this type are employed to move radiating atomic nuclei relative to stable nuclei of the same type at predetermined uniform speeds to investigate the phenomena of nuclear resonance.

Generally, atomic nuclei of the same type are in resonance as long as they are completely stationary relative to each other. The slightest relative movement, however, such as the recoil of radiating nuclei may impair and destroy resonance between nuclei of the same type. In experiments employing apparatus of the type referred to, a package of radiating atomic nuclei known as the "emitter" or the "source of radiation" is moved uniformly toward, and away from, a specimen of stable nuclei of the same type known as the "absorber" at predetermined different speeds to determine the line width of resonance, i.e., how long they remain in resonance when the frequency of the radiations is changed by the Doppler effect, and the character of the resonance line, i.e., the pattern in which resonance between them deteriorates as they are moved at different speed levels relative to each other. In general, the line width of resonance and its pattern are characteristically the same for nuclei of the same type, but differ greatly for different types of nuclei, and may be significantly affected by environmental conditions such as magnetic and gravitational fields.

When stable nuclei are subjected to a beam of radiations emitted from a package of nuclei of the same type, they begin to vibrate, and themselves emit or "scatter" gamma rays uniformly in all directions, if they are in resonance with the radiating nuclei. If they are not in resonance, however, the beam from the source of radiations passes through them and continues its course in substantially the same direction. By placing suitable detectors such as scintillation counters, behind and laterally of a specimen of stable nuclei, it is relatively easy, therefore, to determine whether the specimen is in resonance with a package of radiating nuclei to whose radiations it is subjected. When a counter placed directly behind the specimen in line with the beam of radiations receives all or the major portion of the radiations, the original source of radiations and the specimen are not in resonance. On the other hand, when the counter directly behind the specimen registers a sudden pronounced drop in the amount of radiation received, and the counters arranged around the specimen all register approximately equal amounts of radiation, this indicates that resonance has been established.

It is an object of my invention to provide an apparatus by means of which a specimen may be moved relative to a source of radiations at precisely predeterminable and highly uniform speeds.

Still another object of the invention is to provide an apparatus of the type referred to, which employes a lead screw for moving a table or carriage and wherein any irregularities in the construction of the lead screw and/ or its cooperating nut are unable to impair the uniform course of advance of said carriage or table.

Yet another object of the invention is to provide an apparatus of the type referred to, which employs a number of parallel guide rods for the moving carriage and wherein any non-uniformities in and/or between the guide rods and the manner in which they are mounted, will not impede the uniform progress of the carriage.

These and other objects of the present invention will be apparent from the following description of the accompanying drawings which illustrate a preferred embodiment thereof wherein:

FIGURE 1 is a perspective of the complete assembly of an apparatus embodying my invention;

FIGURE 2 is a vertical section through the table of the apparatus taken along line 2—2 of FIGURE 1 and viewed in the direction of the arrows associated with said line;

FIGURE 3 is a fragmentary side elevation of the table viewed in the direction of the arrows 3—3 in FIGURE 2;

FIGURE 4 is a fragmentary plan view of the table taken in the direction of the arrows 4—4 in FIGURE 2, with part of its surface broken away to expose structure underneath;

FIGURE 5 is a fragmentary detail view taken in the direction of the arrows 5—5 in FIGURE 2;

FIGURE 6 is a fragmentary exploded perspective of the carriage and its drive mechanism;

FIGURE 7 is a somewhat schematic representation of part of the carriage drive mechanism, and FIGURE 8 is a view similar to FIGURE 7 and illustrates a modified form of the carriage drive mechanism.

The apparatus of the invention comprises a heavy horizontally disposed rectangular base plate 10 of metal, which is placed upon a vibration absorbing pad 12 of rubber or similar material. Mounted upon said base plate adjacent the narrow sides thereof are vertically disposed support plates 14 and 16 which may likewise be of metal, and secured in and extending between said plates adjacent the upper edges thereof are two transversely spaced metallic guide rods 18a and 18b. Suitably clamped to said rods adjacent support plate 14 is a transverse bar 20 to which is bolted an upright 22. In the upper end of said upright a tubular enclosure 24 of insulating material is supported in such a position that its axis $x$—$x$ extends parallel to the guide rods 18a and 18b, and within said enclosure may be located a source of radiations (not visible) which is arranged to emit a beam of gamma rays toward the far end plate 16 along said axis $x$—$x$. Mounted upon said end plate 16 is a U-shaped bracket 26 whose vertical legs 28a and 28b support the tubular enclosure 30 of a gamma ray detector in such a manner that its ray emitting window 32 is located in the line of the beam emitted from the source of radiations. During experimentation with the apparatus of the invention, the detector is usually connected to a performance indicating device, such as an oscilloscope, to demonstrate visibly or audibly the response of the detector.

Supported upon the guide rods in the space between the source of radiations and the detector for movement toward and away from said source of radiations is a carriage in the form of table plate 34. Upon said table plate is mounted a rectangular bracket 36 of an insulating plastic within which may be secured a specimen, schematically indicated at 38, in line with the axis $x$—$x$ of the source of radiations and the window of the detector.

The table plate 34 may be moved toward, and away from the source of radiations by rotation of a lead screw 40 that extends below said table plate intermediately of and parallel to the guide bars 18a and 18b, and whose opposite ends are journaled in bearings 42 and 44 (FIG- URE 6) received in suitable apertures of the support plates 14 and 16, respectively. Engaged over said lead screw but restrained from rotational movement therewith is a cylindrical nut 46 which is compelled to move in either direction axially of the lead screw whenever said screw is rotated, depending upon its direction of rotation. In accordance with the invention, said nut 46 is operatively associated with the table 34 in such a manner that it effectively imparts to said table any movement in a direction axially of the lead screw, but is unable to transmit to said table any departures from a precisely rectilinear course such as may be occasioned by departures in the structure of the lead screw from ideal straightness or by irregularities in its threads. Moreover, the invention provides means which block rotation of the drive nut about the axis of the lead screw 40, yet permit said nut to stray slightly in all principal directions from a path parallel to an ideal axis. In this manner the nut may follow freely any departures of the lead screw from coaxiality with the axis of rotation and thus the nut will not bind against the lead screw, which would impair the uniformity of motion imparted to the table by rotation of the lead screw 40.

Having reference to FIGURES 2, 4 and 6, the cylindrical surface of the nut is provided with two oppositely located recesses 48a and 48b that have flat parallel floors 50a and 50b, respectively, which extend along parallel chords or secants of said cylindrical surface and are ordinarily disposed in vertical planes. On either of its sides each of said recesses is bordered by segments 52a, 54a and 52b, 54b, respectively, of the cylindrical body of the nut. Rigidly secured to the floor of a longitudinally extending channel 58 (FIGURE 2) provided in the bottom of the table 34 is the bight portion of a U-shaped bracket 60 that has depending legs 62a and 62b of uneven length. Said legs straddle the nut 46 and loosely engage its recesses 48a and 48b in such a manner that a small but distinct clearance is left between inner surfaces of legs 62a and 62b and the floor 50a and 50b, respectively, of said recesses 48a and 48b, as best shown in FIGURES 2 and 4. Said clearances are large enough to permit the nut to follow any departures in the structure of the lead screw from an ideally straight center axis in a substantially horizontal plane, without bearing against the floors of the recesses 48a and 48b. Means are provided in accordance with the invention which block rotation of the nut 46 within the legs of bracket 60 such as might bring said floors 50a and 50b against the inner faces of said legs and in this manner impart a rotational moment to the bracket, which might twist the table 34 and thus impede its smooth advance along the guide rods 18a and 18b. Said means are arranged, however, to permit such slight transverse movements of the nut in directions at right angles to an ideally straight lead screw axis, as are necessary to enable said nut to follow an imperfect lead screw without placing speed-changing strains upon the intended cooperation between the lead screw and the nut.

For this purpose the elongated leg 62b of bracket 60 preferably is arranged to descend to a level a substantial distance below the nut 46, and carries at its bottom end a pin 64 that projects in a direction parallel to the axis of the drive screw 40. Said pin is slidably engaged in a short vertical slot 66 that is formed in the bottom edge of a vertically disposed elongated plate 68. The upper end of said plate is forked and the prongs thus formed embrace the lead screw 40 and are rigidly secured to an end face of the nut 46.

In operation of the apparatus, when the lead screw 40 is rotated, the nut 46 advances in one or the other direction on said screw axially thereof depending upon the direction of rotation of the screw, since the nut is restrained from rotating with the screw by engagement of the slot 66 in the edge of plate 68 over the pin 64 at the end of the elongated leg 62b of the rotationally immovable bracket 60; and as the nut advances in one or the other direction, the inner faces of one set of the segments 52a, 52b or 54a, 54b, as the case may be, come into contact with, and bear against, the adjacent side faces of the legs 62a and 62b of bracket 60 and in this manner push the table 34 in one or the other directions (FIGURE 4).

Since the plate 68 may turn upon the pin 64 at the remote end of bracket leg 62b, the nut 46 may shift laterally in the space between the legs of the bracket along an arc 69 (FIGURE 7) whose center point lies within the center axis z of pin 64. By elongating the plate 68 and bracket leg 62b as much as the surrounding structure of the apparatus permits, said arc 69 may be made very shallow so that its sector within the confines of the bracket legs is for all practical purposes a horizontal plane. As any rotational movement of nut 46 about axis y would vary the rate of forward movement of plate 34 and cause imperfect reading of any sensing means associated with said plate, the elongated radius of the arc 69 provided by placing the center thereof at remote point z reduces the rotational movement of nut 46 to approximately zero as the nut is moving transversely of the axis y. Thus, while engagement of the slot 66 in plate 68 over the pin 64 at the bottom of bracket leg 62b is effectively blocking rotation of the nut 46 with, and about the rotational axis y of the lead screw 40, it permits the nut to shift laterally along near horizontal planes and follow without hindrance any imperfections in the structure and operation of the lead screw in these directions. Additionally, since the pin 64 is slidably engaged in a vertical slot, the nut 46 is also free to follow any imperfections in the structure and operation of the lead screw in vertical and near vertical planes, as indicated by the arrow lines 71. Hence the nut may follow imperfections in the structure and operation of the lead screw both in horizontal and a vertical direction and may therefore advance without variations in speed along the lead screw during rotation thereof, and impart motion of precisely uniform speed to the table 34.

FIGURE 8 illustrates another modified embodiment of the invention for effectively preventing rotation of the drive nut 46 with the lead screw 40, while permitting said nut to follow imperfections in the structure and operation of the lead screw, i.e., departures of said screw in radial directions from precise coaxiality with its axis of rotation. In the embodiment illustrated in FIGURE 8, the legs 62a' and 62b' of the bracket 60' whose side faces are engaged by the advancing nut during operation of the lead screw in order to advance the table, may be of even length and need not descend below the level of the drive screw. The vertical slot 66' in the bottom edge of the plate 68' is provided at the center point thereof and is slidably and rotatably engaged over a thin guide rod 72 that extends adjacent the base plate 10 of the apparatus in a position parallel to, and verticlly below, the axis of lead screw 40, and may suitably be mounted in the support plates 14 and 16 of the apparatus. During rotation of the lead screw, engagement of the slot 66' in plate 68' over the guide rod 72 prevents rotation of the nut with, and about the axis y of the lead screw but permits what limited rotation of the nut about the guide rod 72 is necessary to accommodate imperfections in the structure and operation of the lead screw. By lowering the guide rod 72 as much as the surrounding structure of the apparatus permits and arranging it vertically below the lead screw, the drive nut may be made to yield to imperfections in the lead screw along an extremely shallow arc 73 extending symmetrically at either side of the ideal center position of the nut; and at the same time the vertical depth of the slot 66' permits the nut to yield along vertical planes in either direction as indicated by the double headed arrow lines 74.

In the embodiment illustrated in FIGURE 8, there is no structural connection, whatsoever, between the driving nut and the driven bracket so that it is impossible for any rotational moments to be imparted by said nut to the table 40 when irregularities in the lead screw and/or the drive nut place rotationally directed strains upon the nut.

Reverting now to the guide rods 18a and 18b upon which the table 34 is supported, the arrangement of the invention is such that only one side of the table slides upon a guide rod while the opposite side of said table is merely held by the other guide rod with the aid of a floating support means that is free to yield in a direction transversely to the advance of the table. In this manner, departures of the guide rods from precise parallelism with each other such as are introduced by the slightest bends in the rods or non-uniformities in the manner in which they are mounted, or by the effect of temperature variations on the table, the rods and/or the supports for the rods, are unable to impede the smooth and uniform advance of the table. Having reference to FIGURES 2, 4 and 6, one side of the table is provided with a longitudinal bore 74 within which are arranged two tubular bearings 75 and 76, and the guide rod 18a passes through and engages slidably said bearings 72 and 74. Along its opposite side edge the table 34 is provided with vertically superimposed horizontal flanges 78 and 80 which form a laterally open channel 81 within which is received the guide rod 18b; and said superimposed flanges 78 and 80 are recessed at a midpoint thereof to form a rectangular gap or interruption 82 of the channel (FIGURE 6). Loosely received within said gap is a block 84 that has a bore 86 provided with a bearing 88 (FIGURE 2) by means of which it is slidably engaged over the guide rod 18b. The block 84 is of such dimensions that its top and bottom surfaces are flush with the top and bottom surfaces of the table plate 34. However, it has a lateral extension 90 of reduced depth which protrudes, and fits slidably, into the channel 81 at one side of the gap 82 so that the upper flange 78 of the table is in fact supported upon said extension 90 (FIGURE 3). A spring 92 is interposed between the floor 94 of channel 81 and the adjacent face of the block 84 to yieldably urge the block and the table apart. As shown in FIGURE 2, said spring may be received in, and held in position by, apertures or holes 96 and 98 formed in the floor of channel 81 and the adjacent face of the block 84, respectively.

On operation, when rotation of the drive screw 40 slides the table plate 34 on guide rod 18a in a direction axially of the drive screw toward or away from the source of radiations, the block 84 by engagement of its extension 90 with the channel 81, provides an independent sliding support for the opposite side of the table, that is taken along by the advancing table due to engagement of the transversely extending edges 100 of the recesses in flanges 78 and 80 with the sides of the block (FIGURE 3); and as said block travels along with, and supports, the table, it may move freely, and is in fact urged by the spring 92, in a transverse direction away from the table, to follow any irregularities in the shape and position of the guide rod 18b. Thus, departures in the shape and position of the guide rod 18b from strict parallelism with the other guide rod 18a are unable to place any strains upon the table as it slides upon the opposite rod 18a, such as might introduce irregularities in the uniform advance of the table.

A ball and disc analogue integrating device 102 (FIGURE 1) such as is described in my U.S. Patent No. 2,602,338, may be employed as a transmission for applying rotary power from any suitable source of rotary power, such as the electric motor 104 shown in FIGURE 1, to the lead screw 40 in a manner permitting infinite variations and precise predeterminations of the speed at which the drive screw is operated. Briefly, such integrating devices employ a disc whose shaft serves as the input element, and said disc is arranged to turn a cylinder through a pair of contacting balls that are interposed between, and in contact with, the flat surface of the disc and the cylindrical surface of the cylinder. Said balls are supported in such a manner that they may be shifted in a direction radially of the disc. When the disc is rotated, the balls are forced to turn, and in turn rotate the cylinder. The shaft of said cylinder constitutes the output element of the device. The angular rotation of the cylinder is proportional to the distance of the balls from the center of the disc times the angular rotation of the disc shaft. Assuming the latter to be constant, the angular rotation of the cylinder is at a maximum when the balls are in contact with the peripheral area of the disc and is zero when the balls are in contact with the center point of said disc. The means for shifting the balls, therefore, constitute means for a precision adjustment of the rotary power applied to the lead screw 40 of the described translating apparatus for the table 34.

Having reference to FIGURE 1, the output shaft of motor 104 carries a pulley 106 which is operatively connected by an endless belt 108 to a pulley 110 which is mounted upon the input shaft 112 of the integrator 102. Said shaft may carry another pulley 114 of a diameter different from the diameter of the pulley 110 so that different input speed may be applied from motor 104 to the disc of the integrator 102. The output shaft 116 of the integrator 102 carries a pulley 118 that is optratively connected by an endless belt 120 (FIGURES 1 and 2) with another pulley 122 which is firmly secured to the end of the lead screw 40, that protrudes from the support plate 14. Rotation of a knob 124 (FIGURE 1) provides adjustment of the position of the power transmitting balls within the integrator 102 in a direction radially of the integrator disc, and thus provides precision adjustment of the speed of rotation applied to the lead screw 40.

It should be noted from FIGURE 1 that the motor 104 and the integrator 102 are mounted upon a separate base plate 126 so that the vibrations of the motor may not be transmitted to the translating apparatus and affect the uniformity of advance of its table 34 or the performance of the detector in enclosure 30. Both the base plate 126 of the motor and the base plate 10 of the translating apparatus may, however, rest upon the same shock-absorbing pad 12.

In using translating apparatus of the type described, it is frequently desirable that the table 34 which supports the specimen or absorber 38, be continually reciprocated at precisely uniform speeds within predetermined limits. The power circuit of the motor 104, therefore, may contain a pair of reversing switches 128 and 130 which are adjustably mounted at predetermined points longitudinally of the apparatus at either side of table 34 upon a rod 133. Said rod extends parallel to the guide rods 18a and 18b and is suitably supported in the plates 14 and 16, (FIGURE 1). The switches 128 and 130 are provided with actuating arms 132 and 134, respectively, that extend into the path of the table 34. Whenever the table reaches its predetermined limit in one or the other direction, the arm 132 or 134 is actuated by the table to reverse operation of the motor 104 and hence of the direction of travel of the table. In addition, another pair of switches 136 and 138 may be supported upon the rod 133, each having an actuating arm 140 and 142, respectively, which extends into the path of the table 34. The switches 136 and 138 are arranged to suspend operation of the detector for as long as they are engaged by the table. The actuating arms of said switches 136 and 138 are located in such a position with respect to the arms 132 and 134 of the motion reversing switches 128 and 130 that they are engaged by the moving table directly before the table engages the control arms of the motion reversing switches 132 and 134. Thus, operation of the detector and/or of any performance indicating device that may be connected to said detector to visibly or audibly demonstrate its response, is suspended for the brief moment when the table slows down, comes to a halt and speeds up to its normal uniform speed level in the opposite direction. Hence, the performance indicating device is unable to indicate, or record, a test performance while the table departs from its predetermined uniform speed.

While I have described my invention with the aid of a particular embodiment thereof, it will be understood that the invention is not limited to the specific constructional details shown and described by way of example, which may be departed from without departing from the scope and spirit of the invention.

I claim:

1. In an apparatus for providing a rectilinear motion to a movable carriage along linear guide means by a rotatable lead screw positioned parallel to said guide means, a carriage drive mechanism connecting said carriage to said lead screw for providing said motion independently of irregularities in said lead screw, said carriage drive mechanism comprising:

a nut threadably engaging said rotatable lead screw, and drive means connected to said carriage and coupled to said nut for urging said carriage along said guide means upon rotation of said lead screw, the coupling to said nut being a loose engagement for isolating said drive means and said carriage from non-axial movement of said nut caused by irregularities in said lead screw.

2. Apparatus for advancing an article along a rectilinear path at uniform speeds comprising support means for the article, linear guide means for said support means, a lead screw rotatably supported parallel to said guide means, a nut on said lead screw, a leg secured to said support means and arranged to abut said nut in a direction axially of said lead screw, and means supported for rotation about a point remote from the axis of rotation of said lead screw for holding said nut against rotation with said lead screw while permitting it to depart from precise coaxiality with said axis of rotation in directions radially thereof.

3. Apparatus for advancing an article along a rectilinear path at uniform speeds comprising support means for the article, linear guide means for said support means, a lead screw rotatably supported parallel to said guide means, a nut on said lead screw, a leg secured to said support means and arranged to abut said nut in a direction axially of said lead screw, and means supported for rotation about and linear movement relative to a point remote from the axis of rotation of said lead screw for holding said nut against rotation with said lead screw while permitting it to depart from precise coaxiality with said axis of rotation in directions radially thereof.

4. Apparatus for advancing an article along a rectilinear path at uniform speeds comprising support means for the article, linear guide means for said support means, a lead screw rotatably supported parallel to said guide means, a nut on said lead screw having recesses at opposite sides thereof, each having a flat floor and two side walls, a pair of legs secured to said support means and extending between the side walls of said recesses in a position spaced from the floors thereof, and means secured to said nut and supported for rotation about a point remote from the axis of rotation of said lead screw in a plane perpendicular to the said axis, to hold said nut against rotation with said lead screw about said axis of rotation while permitting it to depart from precise coaxiality with said axis of rotation in directions radially thereof.

5. Appaartus for advancing an article along a rectilinear path at uniform speeds comprising support means for the article, linear guide means for said support means, a lead screw rotatably supported parallel to said guide means, a nut on said lead screw having recesses at opposite sides thereof, each having a flat floor and two side walls, a pair of legs secured to said support means and extending between the side walls of said recesses in a position spaced from the floors thereof, and means secured to said nut and supported for rotation about and linear movement relative to a point remote from the axis of rotation of said lead screw in a plane perpendicular to said axis, to hold said nut against rotation with said lead screw about said axis of rotation while permitting it to depart from precise coaxiality with said axis of rotation in directions radially thereof.

6. Apparatus for moving a source of radiations relative to a specimen at uniform speeds along a rectilinear path in either direction thereof comprising support means for one of said articles, linear guide means for said support means, a lead screw rotatably supported parallel to said guide means, a nut on said lead screw having recesses on opposite sides thereof each having a flat floor and two side walls, a short and an elongated leg secured to said table means and arranged to extend through said recesses between said side walls but spaced from said floors thereof, and means for preventing rotation of said nut with said lead screw while permitting said nut to shift in the space between said legs in direction radially of the axis of rotation of said lead screw including a pin secured to the free end of said elongated leg and an elongated plate secured to said nut and having a slot engaged over said pin.

7. Apparatus for moving a source of radiations relative to a specimen at uniform speeds along a rectilinear path in either direction thereof comprising support means for one of said articles, linear guide means for said support means, a lead screw rotatably supported parallel to said guide means, a nut on said lead screw having recesses on opposite sides thereof each having a flat floor and two side walls, legs secured to said support means and arranged to extend through said recesses between said side walls yet spaced from said floors thereof, and means for preventing rotation of said nut with said lead screw while permitting said nut to shift within the space between said legs in directions radially of the axis of rotation of said lead screw including a guide rod supported vertically below and remote from said lead screw in a position parallel thereto, and a member secured to said nut and having in its remote end a vertical slot engaged over said guide rod.

8. Apparatus for guiding an article along a rectilinear path at uniform speeds comprising table means for supporting the article, first linear guide means for slidably supporting one part of said table means, second linear guide means arranged to extend substantially parallel to said first linear guide means adjacent a second part of said table means, and support means slidably supported upon said second linear guide means for supporting said second part of said table means in a manner permitting relative movement between said support means and said table means in a direction transverse of said guide means.

9. Apparatus for guiding an article along a rectilinear path at uniform speeds comprising table means for supporting the article, first linear guide means for slidably supporting one part of said table means, second linear guide means arranged to extend substantially parallel to said first linear guide means adjacent a second part of said table means, support means slidably supported upon said second linear guide means for supporting said second part of said table means in a manner permitting relative movement between said support means and said table means in a direction transverse of said guide means, and interengaged means on said table means and said support means constraining said support means to move in unison with said table means in a direction parallel to said linear guide means.

10. Apparatus for guiding an article along a rectilinear path at uniform speeds comprising a table plate having a flange provided along one side edge thereof, said flange having a recess, a first guide rod arranged to slidably support the opposite side of said table plate, a second guide rod arranged to extend substantially parallel to said first guide rod adjacent said flange, and a block slidably supported on said second guide rod and received freely within said recess for limited movement therein relative to said table plate in a direction transverse of said guide rods, said block having an extension arranged to support said flange.

11. Apparatus for guiding an article along a rectilinear path at uniform speeds comprising a table plate having a flange provided along one side edge thereof, said flange having a recess, a first guide rod arranged to slidably support the opposite side of said table plate, a second guide rod arranged to extend substantially parallel to said first guide rod adjacent said flange, a block slidably supported on said second guide rod and received freely within said recess for limited movement therein relative to said table plate in a direction transverse of said guide rods, said block having an extension arranged to support said flange, and means yieldably urging said block and said table plate apart.

12. Apparatus for guiding an article along a rectilinear course comprising a table plate having superposed flanges provided along one side edge thereof, said flanges having vertically aligned recesses, a first guide rod arranged to slidably support the opposite side of said table plate, a second guide rod arranged to extend substantially parallel to said first guide rod intermediately of said table flanges, a block slidably supported on said second guide rod and received freely within said recesses for limited movement therein relative to said table plate in a direction transverse of said guide rods, said block having an extension extending into the channel formed by said table flanges to support the upper one of said table flanges, and spring means interposed between said block and said table plate.

13. In apparatus for moving a source of radiations relative to a specimen along a rectilinear path at precisely uniform speeds, the combination of a table means for one of said articles, first linear guide means for supporting one part of said table means, second linear guide means arranged substantially parallel to said first linear guide means adjacent a second part of said table means, support means slidably supported upon said second guide means for supporting said second part of said table means in a manner permitting relative movement between said support means and said table means in a direction transverse of said guide means, and interengaged means on said table means and said support means for constraining said support means to move in unison with said table means; with means for advancing said table means along said guide means including a lead screw rotatably supported in a position parallel to said guide means, a nut on said lead screw, legs secured to said table means and arranged to abut said nut in a direction axially of said lead screw, and means supported for sliding movement relative to and rotation about a point remote from the axis of rotation of said lead screw in a plane perpendicular to the axis of said lead screw, for holding said nut against rotation with said lead screw about said axis of rotation thereof while permitting said nut to depart from precise coaxiality with said axis of rotation in directions radially thereof.

14. In apparatus for moving a source of radiations relative to a specimen along a rectilinear path at precisely uniform speeds, the combination of table plate means for supporting one of said articles having a flange provided along one side edge thereof, said flange having a recess, a first guide rod arranged to slidably support the opposite side of said table plate means, a second guide rod arranged to extend substantially parallel to said second guide rod below said flange and a block slidably supported upon said second guide rod and received freely in said recess for limited movement therein relative to said table plate means in a direction transverse of said guide rods, said block having an extension arranged to support said flange, with means for advancing said table along said rods comprising a lead screw rotatably supported in a position parallel to said guide rods, a nut on said lead screw having recess located on opposite sides thereof each having a flat floor, legs secured to said table plate means and arranged to extend through the recesses of said nut in positions spaced from the floors thereof, and means for holding said nut against rotation with said lead screw while permitting said nut to depart within the space between said legs from precise coaxiality with the axis of rotation of said lead screw in directions radially thereof, including a guide rod supported below and parallel to said lead screw and a member rigidly secured to said nut and having a vertical slot engaged over said last mentioned guide rod.

15. In apparatus for moving a source of radiations relative to a specimen along a rectilinear path at precisely uniform speeds, the combination of table plate means for supporting one of said articles, having a flange provided along one side edge thereof, said flange having a recess, a first guide rod arranged to slidably supoprt the opposite side of said table plate means, a second guide rod arranged to extend substantially parallel to said second guide rod below said flange, and a block slidably supported upon said second guide rod and received freely in said recess for limited movement therein relative to said table plate means in a direction transverse of said guide rods, said block having an extension arranged to support said flange; with a lead screw rotatably supported in a position parallel to said guide rods, a nut on said lead screw having recesses located on opposite sides thereof each having a flat floor, a short and an elongated leg secured to said table plate means and arranged to extend through the recesses of said nut in positions spaced from the floors thereof, and means for holding said nut against rotation with said lead screw while permitting said nut to depart within the space between said legs from precise coaxiality with the axis of rotation of said lead screw in directions radially thereof including a pin provided at the remote end of said elongated leg and an elongated plate rigidly secured to said nut and having a vertical slot in a remote edge thereof engaged over said pin.

References Cited
UNITED STATES PATENTS

| | | | |
|---|---|---|---|
| 2,707,659 | 5/1955 | Sloyan | 248—23 |
| 2,894,408 | 7/1959 | Verhoeff | 74—424 |
| 3,179,800 | 4/1965 | McNamara | 250—52 |

RALPH G. NILSON, *Primary Examiner.*

A. L. BIRCH, *Assistant Examiner.*